United States Patent [19]

Taft et al.

[11] Patent Number: 4,683,493

[45] Date of Patent: Jul. 28, 1987

[54] COMPACT OPTICAL APPARATUS FOR TRACKING A PATH OF MOVEMENT OF A TOOL ALONG A LINE OF TRAVEL ON A WORKPIECE

[75] Inventors: Jeffrey D. Taft; James O. Seymour, Jr., both of Murrysville Boro, Pa.

[73] Assignee: Westinghouse Electric Corp., Pittsburgh, Pa.

[21] Appl. No.: 876,520

[22] Filed: Jun. 20, 1986

[51] Int. Cl.⁴ ............................................. H04N 7/18
[52] U.S. Cl. .............................. 358/101; 219/124.34; 358/167; 358/213.15; 358/213.18
[58] Field of Search ............... 358/101, 166, 167, 213; 382/8; 219/124.34; 901/47

[56] References Cited

U.S. PATENT DOCUMENTS

| | | | |
|---|---|---|---|
| 3,426,174 | 2/1969 | Graham et al. | 219/124.34 |
| 3,957,339 | 5/1976 | Engel. | |
| 4,184,748 | 1/1980 | Kugler et al. | 350/190 |
| 4,280,137 | 7/1981 | Ashida et al. | 358/101 |
| 4,497,996 | 2/1985 | Libby, Jr. et al. | 219/124.34 |
| 4,527,043 | 7/1985 | Hashiura et al. | 219/121 LQ |
| 4,542,279 | 9/1985 | Case, Jr. et al. | 219/124.34 |
| 4,547,800 | 10/1985 | Masaki | 358/101 |
| 4,567,348 | 1/1986 | Smith | 358/101 |
| 4,578,561 | 3/1986 | Corby | 358/101 |
| 4,611,231 | 9/1986 | Kobayashi | 358/167 |
| 4,612,575 | 9/1986 | Ishman | 358/167 |
| 4,618,928 | 10/1986 | Honda | 358/167 |
| 4,622,587 | 11/1986 | Dudley | 358/167 |

Primary Examiner—Howard W. Britton

[57] ABSTRACT

A compact optical apparatus for tracking a path of movement of a tool along a line of travel on a workpiece, includes a light source for providing a collimated light beam, wherein the light source is mounted on the tool adjacent the rear of the tool. A cylindrical reflector is mounted adjacent one side of the tool and is positioned in the path of the collimated light beam to reflect at least a portion of the collimated light beam to project a light stripe on the workpiece in front of the tool. The cylindrical reflector is positioned with respect to the collimated light beam and the line of travel of the tool so that the projected light stripe is substantially bisected by the line of travel. A camera is oriented to face away from the workpiece and is used to generate an image of the light stripe projected on the workpiece. An autocorrelation filter is connected to the camera in situations where the tool causes transient images to be produced on the image, for example, when the tool is a seam welder which produces sparks which travel across the field of view of the camera. The autocorrelation filter is employed to remove the spark trails from the image of the projected light stripe.

23 Claims, 9 Drawing Figures

COMPACT OPTICAL APPARATUS FOR TRACKING A PATH OF MOVEMENT OF A TOOL ALONG A LINE OF TRAVEL ON A WORKPIECE

BACKGROUND OF THE INVENTION

This invention relates to optical apparatus for tracking a path of movement of a tool along a line of travel on a workpiece, and in particular, to a compact apparatus which allows the tool to be operated in confined areas. This invention also relates to a filter for use with a seam welding system having a torch which generates spark trails.

Optical apparatus for tracking a path of movement of a tool along a line of travel on a workpiece have been developed which employ a projected light stripe to track the path of movement based on the geometry of the light stripe. An optical system (e.g., a camera) is used to collect data relating to the geometry of the light stripe, and three-dimensional information is calculated to describe, for example, part type, location and orientation. This information is then ultimately used to alter the path or control the operation of a tool, such as an industrial manipulator or a hard automation device. An example of one such light stripe tracking system is described in U.S. patent application Ser. No. 756,002, filed July 17, 1985, now U.S. Pat. No. 4,652,133, by R. S. Antoszewski et al. and assigned to the assignee of the subject application, the contents of which are hereby incorporated by reference. This application describes a light stripe seam tracking system which is employed on a seam tracker for a welding apparatus employing a torch. This type of seam welding apparatus is manufactured and sold by Westinghouse Electric Corporation. The optical tracking apparatus employs a light stripe generating apparatus and an imaging apparatus for generating an image of the light stripe on the workpiece. The optical assembly, including both the light stripe generating apparatus and the imaging apparatus, is placed in an enclosure in front of the torch along the line of travel of the torch. In addition, a relatively bulky helium neon laser is employed as a light source. As a result, the optical assembly enclosure protrudes approximately 4 inches in front of the seam welder, thereby making it difficult to employ the seam welder in confined areas (e.g., when it is necessary to continue a weld to a position abutting a wall or a bulkhead).

Several attempts have been made to reduce the size of the optical assembly for seam trackers. In one apparatus, a fiber optic bundle is placed in front of the torch and the light stripe is centered along the line of travel using a termination block, a lens and an aperture. In another apparatus, a cylindrical mirror is placed in front of the torch to create the light stripe, and additional mirrors and lenses are employed to properly position the light stripe along the line of travel. Despite the above attempts to decrease the size of the optical assembly, it has not been possible to make the optical tracking apparatus sufficiently compact because the optical assembly has been positioned in front of the seam welder along the line of travel. Thus, there remains a need in the art for a compact optical tracking apparatus which is capable of accurately tracking a path of movement of a tool even when the tool must be used in confined areas (e.g., abutting a wall or a bulkhead).

Light stripe tracking systems of the type described in U.S. Pat. No. 4,652,133 also typically employ a camera which is pointed downward to focus on the light stripe projected on the workpiece, and which is positioned adjacent the torch. As a result, it is necessary to provide a spatter shield in front of the camera so as to protect the camera from spattering and film build-up on the camera. Even if a spatter shield is employed, it is necessary to replace the spatter shield often due to film build-up on the shield itself. Further, even if a spatter shield is employed, there remains some distortion in the image generated by the camera. This distortion is a result of the glare generated by the torch and the spark trails in the image which are generated as a result of welding. With respect to spark trail distortion, television images of welding processes, and especially metal inert gas (MIG) processes, suffer from visual interference caused by sparks and spatter passing through the field of view of the camera. Since area-type television cameras are inherently integrating devices, the sparks and spatter produce intense streaks in each video frame. In seam tracking systems, these streaks can easily be confused with the image of the light stripe projected onto the workpiece and can lead to an error in the calculated three-dimensional position measurement. Thus, there is a need to remove the streaks from the image without modifying the light stripe signal itself. In summary, there is a need in the art for an optical apparatus which is capable of providing a clear image of a projected light stripe without the presence of distortion caused by glare or spark trails.

SUMMARY OF THE INVENTION

Accordingly, it is an object of the present invention to provide an optical apparatus for tracking a path of movement of a tool along a line of travel which overcomes the deficiencies of prior art apparatus.

In particular, it is an object of the present invention to provide an optical apparatus for tracking a path of movement of a tool along a line of travel on a workpiece, which is compact relative to available optical apparatus.

It is another object of the present invention to provide an optical apparatus which provides an image of a projected light stripe which is not deteriorated by glare and spatter from a welding torch.

It is a further object of the present invention to provide an optical apparatus which is capable of providing a clear image of a light stripe projected on a workpiece without any distortion caused by spark trails or other transient images having paths which temporarily extend through the field of view of the optical apparatus.

The present invention is directed to an optical apparatus for tracking a path of movement of a tool along a line of travel on a workpiece. The tool has a first side in front of the tool along the line of travel, a second side behind the tool along the line of travel, and a third side substantially perpendicular to the line of travel. The optical apparatus includes a light source which is mounted on the tool adjacent the second side of the tool, for providing a collimated light beam. A convex cylindrical reflector is positioned in the path of the collimated light beam and is mounted adjacent the third side of the tool, for reflecting at least a portion of the light beam so as to project a light stripe on the workpiece in front of the tool. The cylindrical reflector is positioned with respect to the light source and the line of travel of the tool, so that the light stripe is bisected by the line of travel. The optical apparatus of the present invention also includes means for generating an image of the light stripe projected on the workpiece.

In the optical apparatus of the present invention, the image generating means includes a camera mounted on the tool and oriented in a direction such that the camera faces away from the workpiece, and means for reflecting an image of the workpiece adjacent the projected light stripe, into the camera.

In one embodiment of the optical apparatus of the present invention, the camera which is used as the image generating means, is connected to a filter for filtering out the streaks in the generated image, which are caused by spark trails and spatter from a welding operation. The filter is an autocorrelation spark trail filter and is connected to the output of the camera. The autocorrelation spark trail filter includes a video analog-to-digital converter for converting an image signal output by the camera to a digital signal, and a pixel-by-pixel multiplier connected to the video analog-to-digital converter. First and second video frame buffers are connected to thd video analog-to-digital converter and to the pixel-by-pixel multiplier. A microprocessor unit is used to selectively switch the connections between the first and second video frame buffers and the video analog-to-digital converter and the pixel-by-pixel multiplier. That is, when the first video frame buffer is connected to the video analog-to-digital converter, the second video frame buffer is connected to the pixel-by-pixel multiplier. Conversely, when the second video frame buffer is connected to the video analog-to-digital converter, the first video frame buffer is connected to the pixel-by-pixel multiplier. Further, the digital image signal provided by the video analog-to-digital converter is also provided to the pixel-by-pixel multiplier. Thus, as one of the first and second video frame buffers stores a current video frame from the digital image signal, that current video frame is also multiplied by the stored previous video frame which is provided to the pixel-by-pixel multiplier by the other one of the first and second video frame buffers. The multiplied output of the pixel-by-pixel multiplier produces a filtered image which does not include streaks resulting from spark trails or spatter from a welding operation.

The optical apparatus of the present invention has a number of advantages over the prior art in that the arrangement of the light source, cylindrical reflector and image generating means with respect to the tool provides a compact optical apparatus which can be used in confined areas. The optical apparatus of the present invention requires fewer elements for creating a light stripe than prior art apparatus. Further, the optical apparatus of the present invention is optically efficient since there is little attenuation because there is no requirement that a plurality of mirrors or prisms be used to alter the path of the light plane reflected by the cylindrical reflector. By employing the laser diode as the light source, the present invention employs a light source having a power level (5 to 20 mW) which is within a safety range for use without special shielding to prevent eye injuries. In addition, by using the cylindrical reflector, there is no requirement for moving parts (such as in prior art apparatus employing galvanometers or other electromechanical scanners) and the parts are generally passive except for the light source. By orienting the camera which forms the image generating means in a direction opposite the surface of the workpiece, distortions in the image due to glare and spatter are reduced and the camera is protected against deleterious environmental conditions produced by operation of the tool (e.g., spatter caused by welding). Another advantage is that a simple lens can be used for the camera since the depth of field can be much greater when the camera is not positioned close to the work surface. That is, with a longer path length from image to camera, adjustments can be made to achieve a greater depth of field. When the optical apparatus is employed with a welding apparatus, this allows for greater height variation in the surface to be welded. Finally, by employing the autocorrelation spark trail filter of the present invention, a clear image is provided which does not include any streaking caused by temporary (i.e., transient) environmental conditions adjacent the tool (e.g., spark trails generated by a welding apparatus).

These together with other objects and advantages which will be subsequently apparent, reside in the details of construction and operation as more fully hereinafter described and claimed, reference being had to the accompanying drawings, forming a part hereof, wherein like numerals refer to like parts throughout.

DETAILED DESCRIPTION OF THE PREFERRED EMBODIMENTS

Figure 1:
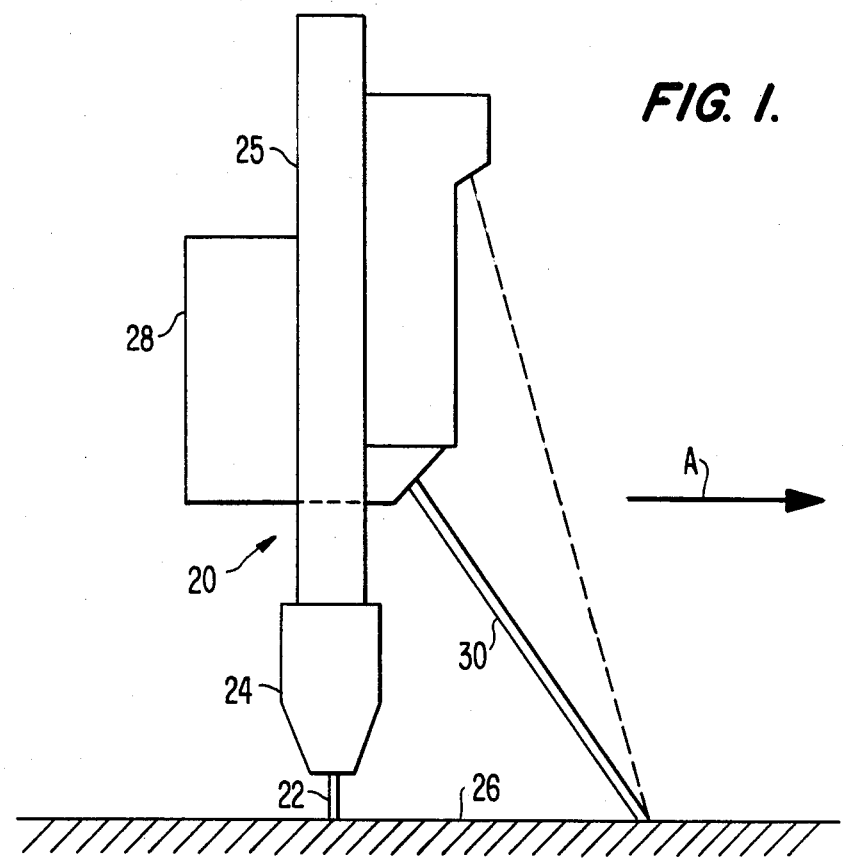
FIG. 1 is a schematic view of an embodiment of the compact optical apparatus of the present invention and the arrangement of the optical apparatus on a seam welder.

FIG. 1 is a schematic view of a tool 20 having a compact optical tracking apparatus mounted thereon in accordance with the present invention. In the illustration of FIG. 1, the tool 20 is a seam welder comprising a torch having a torch tip 22, a shield gas cup 24, and a shank 25. The tool 20 is moved in the direction of arrow A and performs a welding operation on a workpiece 26. The optical apparatus of the present invention is mounted in an enclosure 28 which extends from the rear to the front of the tool 20. The optical apparatus of the present invention is used to generate a light plane 30 so that a light stripe is projected onto the workpiece 26 along the line of travel of the torch tip 22. A camera is mounted in the enclosure 28 and has a field of view which includes the light stripe. Thus, the camera is used to generate an image of the light stripe so that three-dimensional information can be generated for the points on the light stripe.

Figure 2:
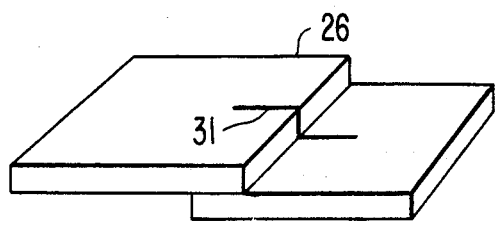
FIG. 2 is a perspective view of a workpiece positioned for lap welding and a light stripe projected thereon.
Figure 3:
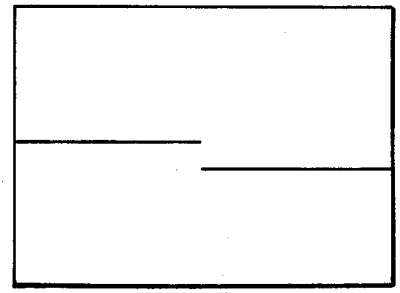
FIG. 3 is a schematic view of the image produced by the optical apparatus of the present invention based on the light stripe projection of FIG. 2.

Referring to FIG. 2, if the tool 20 is to be used for lap welding (so that the line of travel of the tool 20 is along the overlapped portions of two workpieces 26), then the portion of a light stripe 31 crossing the seam between the two workpieces 26 will appear as a discontinuity in the image produced by the camera, as illustrated in FIG. 3. The image produced by the camera is digitized, and by using optical triangulation, the appropriate path information can be determined, so that any necessary correction to the planned path of the tool can be made to ensure that the tool travels properly along the seam. The type of optical triangulation which is used to develop the proper path information is well known in the art and is described, for example, in U.S. Pat. No. 4,542,279 to Case, Jr. et al. the contents of which are hereby incorporated by reference.

Figure 4:
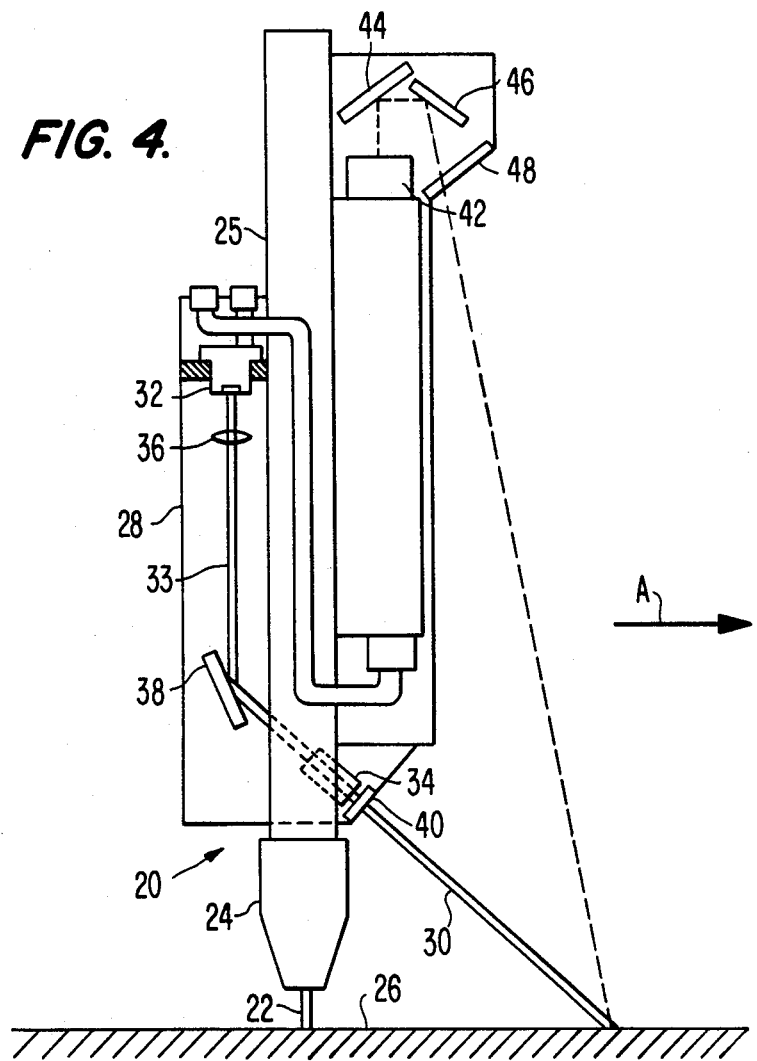
FIG. 4 is a schematic view, partially in cross-section and partially in phantom, showing the arrangement of the optical apparatus of the present invention, including the light source, the cylindrical reflector and the camera, on a seam welder.

FIG. 4 is a side view, partially in cross-section and partially in phantom, illustrating the arrangement of the optical apparatus of the present invention with respect to the tool 20. For convenience, the tool 20 is defined to have a first side which is in front of the tool 20 along the line of travel and a second side which is behind the tool 20 (i.e., opposite the front side) along the line of travel. The tool 20 also has third and fourth sides which are substantially perpendicular to the line of travel on opposite sides of the tool 20. The optical apparatus of the present invention includes a light source 32 for generating a collimated light beam 33. The light source 32 is mounted on the tool 20 adjacent the second side of the tool. A means for diffusing the collimated light beam 33 in one dimension, which in the preferred embodiment is a convex cylindrical reflector 34, is positioned in the light path of the collimated light beam 33 and is mounted adjacent the third side of the tool to reflect at least a portion of the collimated light beam 33 so as to produce the light plane 30 which projects the light stripe 31 on the workpiece 26 in front of the tool 20 (i.e., on the first side of the tool 20). A collimating lens 36 is used to focus the collimated beam 33 and a plane mirror 38 is used to adjust the path of the collimated beam 33 with respect to the cylindrical reflector 34. A window 40 serves as a spatter shield for protecting the optical elements, including the cylindrical reflector 34, from the environment (e.g., the spatter which is caused during a welding operation).

In the preferred embodiment of the present invention, the light source 32 is a laser diode which is positioned to one side and behind the shank 25 of the torch 20, so that the collimated beam 33 will not strike the shank 25 when the cylindrical reflector 34 is positioned in the path of the collimated beam. The thickness of the light plane 30 is the same as the beam diameter (less than 1 mm) of the collimated beam 33. The collimated light beam 33 has a diameter of from 0.5 to 1.5 mm. In addition, the light beam 30 which is reflected by the cylindrical reflector 34 must have a path which is above the shield gas cup 24. The shield gas cup 24 shields the window 40 through which the light plane 30 is projected, to prevent spatter from hitting the window 40. Air is also passed over the window 40 to keep it spatter-free. In the preferred embodiment, the laser diode which serves as the light source 32 has a wavelength of 780 nm and a power of from 5 to 20 mW which is within the acceptable safety range. Preferably, the laser diode has a power of 6 mW. If it is necessary to further focus the collimated beam 33, a Gallilean beam compressor can be positioned in the path of the collimated beam 33 between the collimating lens 36 and the plane mirror 38. In the preferred embodiment, the cylindrical reflector 34 is a piece of cylindrical glass. However, if desired, a reflective coating can be placed on the glass to increase the amount of light reflected by the cylindrical reflector 34.

The optical apparatus of the present invention also includes an image generating means comprising a camera 42 and plane mirrors 44 and 46. The camera 42 is oriented to face a direction opposite the torch tip 22, and the plane mirrors 44 and 46 are employed to reflect an image of the workpiece including the light stripe 31 into the camera 42. A window 48 protects the camera 42 and the related optical apparatus from deleterious conditions in the environment. In the prior art, a cylindrical lens or galvanometer has been used to create a light stripe. A cylindrical lens will fan out or defocus light symmetrically, as will a galvanometer. That is, the fan out of light on each side of the axis of the incoming light beam will have the same angle with respect to the axis of the incoming light beam. As a result, such optical apparatus have typically been placed in front of the tool in light stripe tracking systems because the light stripe must be symmetrical with respect to the line of travel. That is, the light stripe must be bisected by the line of travel and must also be substantially perpendicular to the line of travel.

Figure 5:
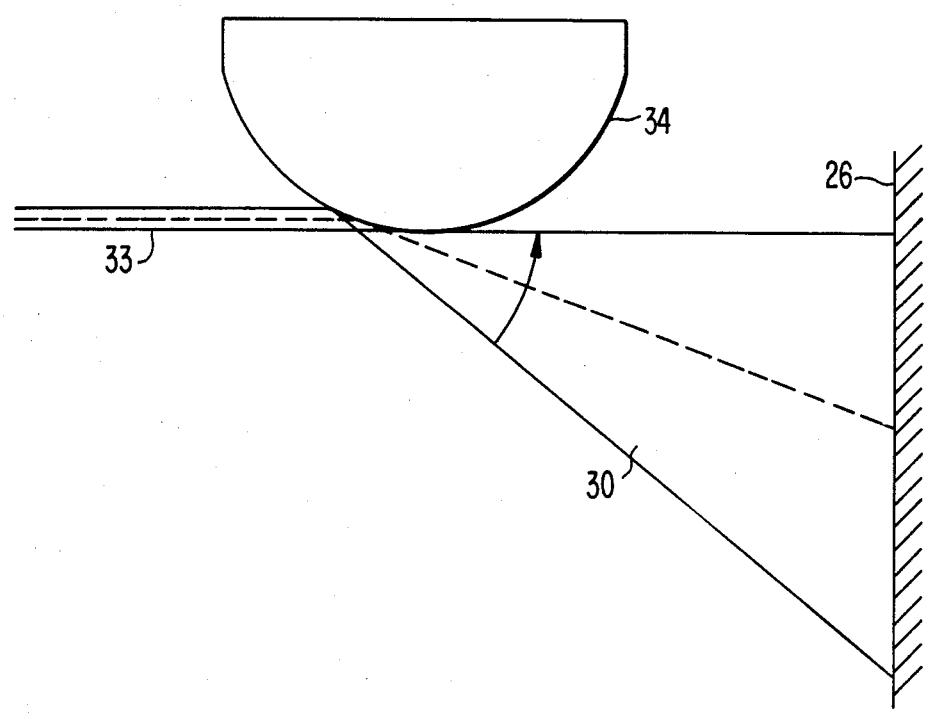
FIG. 5 is a side view of the cylindrical reflector, which is used to illustrate the reflection of a collimated light beam to produce a light stripe on the workpiece.
Figure 6:
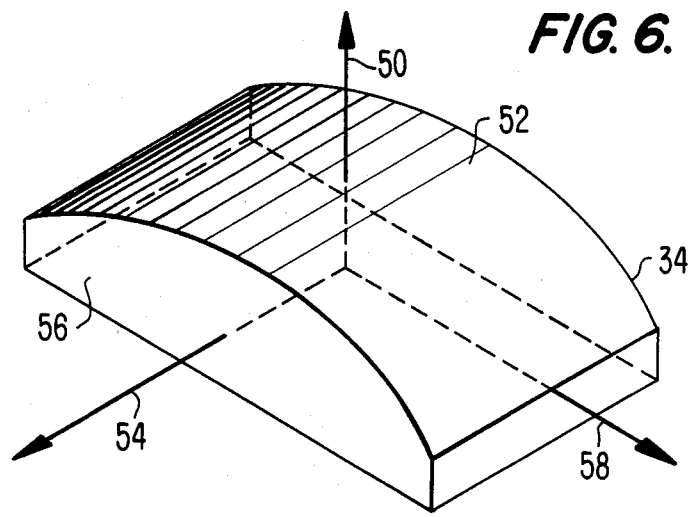
FIG. 6 is a perspective view of the cylindrical reflector of FIG. 5.

FIG. 5 illustrates the convex cylindrical reflector 34 positioned in the path of the collimated light beam 33 for reflecting a portion of the light beam 33 to produce the light plane 30 which projects the light stripe 31 (FIG. 2) on the workpiece 26. In contrast to cylindrical lenses and galvanometers, a cylindrical reflector fans out light asymetrically as illustrated in FIG. 5. By positioning the cylindrical reflector 34 on one side of the tool 20, the optical apparatus of the present invention takes advantage of the fact that the cylindrical reflector 34 fans out light asymetrically. That is, by positioning the cylindrical reflector 34 on one side of the tool 20 and not in front of the tool 20 (as in the prior art) it remains possible to meet the requirement that the light stripe be bisected by, and substantially perpendicular to, the line of travel. Further, this result can be produced without using any additional mirrors, lenses, etc. to alter the path of the light plane 30 reflected by the cylindrical reflector 34. The cylindrical reflector 34 is positioned so that the collimated beam 33 is parallel to the back side of the cylindrical reflector 34 and parallel to the normal axis of the cylindrical reflector 34. Referring to FIG. 6, the cylindrical reflector 34 includes a principal axis 50 which is normal to a top face 52 of the cylindrical reflector 34 and a longitudinal axis 54 through a side face 56 of the cylindrical reflector 34. A normal axis 58 is defined to be normal to the principal axis 50 and the longitudinal axis 54. In the present invention, the collimated beam 33 is directed to be parallel to the normal axis 58.

Figure 7:
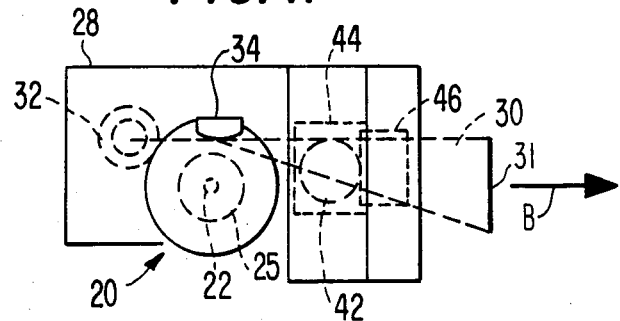
FIG. 7 is a top view of the embodiment of FIG. 4, partially in phantom.

FIG. 7 is a top view, partially in phantom, which schematically illustrates the relative positions of the light source 32, the cylindrical reflector 34 and the camera 42 with respect to the tool 20. As illustrated in FIG. 7, the light stripe 31 which is projected on the workpiece 26, is bisected by the line of travel which is represented by the arrow B, and is also substantially perpendicular to the line of travel. As illustrated in FIG. 7, the asymmetrical nature of the light plane 30 reflected by the cylindrical reflector 34, and the positioning of the cylindrical reflector 34 on one side of the tool 20 provides the resultant light stripe 31 which is bisected by and substantially perpendicular to the line of travel. The specific location of the light stripe 31 is a function of the diameter of the collimated beam 33 the radius of curvature of the cylindrical reflector 34 and the path length. In general, it is desirable to have the light stripe positioned about 3 inches ahead of the tip 22 of the tool 20 along the line of travel. Further, the camera 42 is positioned so that its field of view is bisected by the light stripe, and so that the mid-point of the light stripe is intersected by the line of travel and corresponds to the mid-point of the field of view.

It should be noted that when the tool 20 is moved, the geometry of the camera 42 and the light stripe 31 with respect to each other, is fixed because of the relative positioning of the camera 42 and the cylindrical reflector 34 on the tool 20. Therefore, even if the tool is slanted at an angle, this will not effect the accuracy of the image generated by the camera 42. In the preferred embodiment, the tool 20 should be within 25° of normal with respect to the surface of the workpiece 26.

The optical apparatus of the present invention is more compact than prior apparatus since the light source 32 and the cylindrical reflector 34 are not positioned in front of the tool 20 but are instead positioned to the side of and behind the tool 20 (see FIG. 7). As a result, a tool having the optical tracking apparatus of the present invention mounted thereon, is capable of being used in confined areas. For example, it is sometimes necessary to weld a joint to a position abutting a wall or a bulkhead. Since only the camera 42 of the optical apparatus of the present invention is positioned in front of the tool 20, it is possible to move the tool 20 into confined areas.

Figure 8:
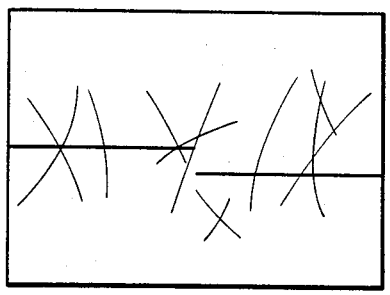
FIG. 8 is a schematic view, similar to FIG. 3, but showing an image having streaks caused by spark trails from a welding operation.

Another aspect of the optical apparatus of the present invention relates to the above-described problems of welding apparatus employing seam tracking systems, wherein streaks in the image generated by the camera may be confused with the light stripe projected onto the work surface. FIG. 8 is a schematic view of an image, similar to FIG. 3, illustrating the type of streaks caused by spark trails, which may appear on the image of the light stripe 31 and which may result in erroneous three-dimensional calculations for the light stripe 31.

The present invention provides an autocorrelation filter for accomplishing filtering of spark trails based on the following factors:

(1) solid-state (CCD) cameras have virtually no lag (signal retention) from frame to frame;

(2) any given spark trail exists in only one television frame; and (3) light stripe images are approximately constant from frame to frame, except at sudden seam or joint discontinuities.

Based on these factors, the apparatus of the present invention attempts to separate the light stripe image from the spark trails by measuring autocorrelation for the image over time. Spark trails have autocorrelation functions which decrease very rapidly as a function of time lag and, in fact, are nearly impulses. In contrast, light stripe autocorrelation functions drop off slowly, so that a real time computation of temporal autocorrelation can separate light stripe and spark trail signals in television images obtained using solid-state cameras. This autocorrelation is carried out at television frame rates (i.e., 30 times per second). It should be noted that the lag of a vidicon camera would blur the distinction between the light stripe image and the spark trails, and therefore is not suitable for use as a sensor.

Figure 9:
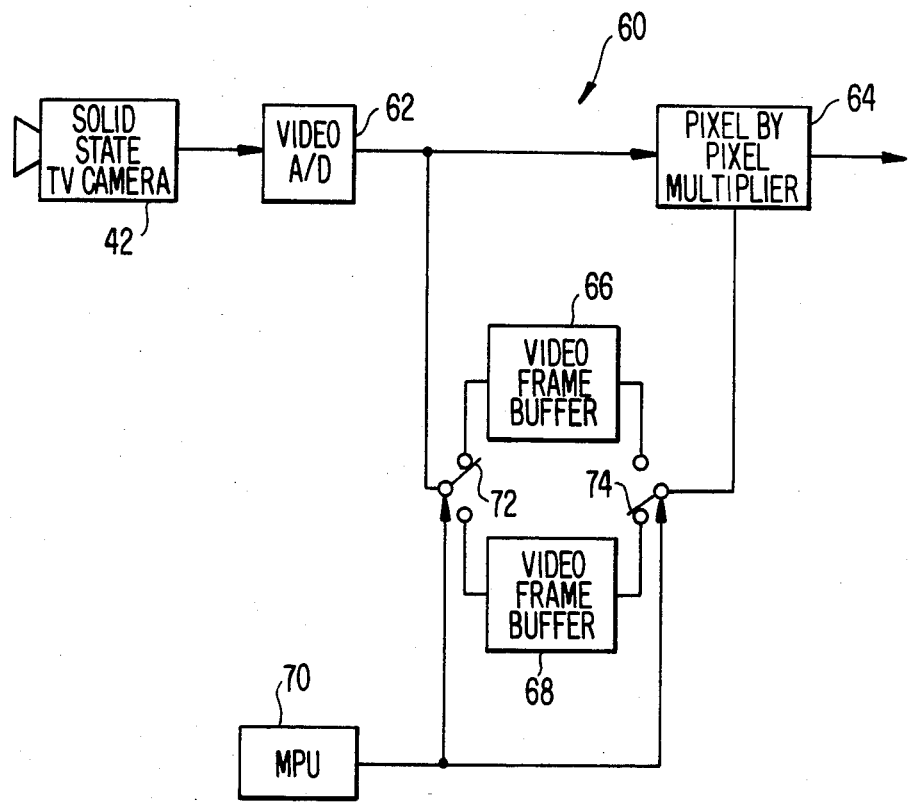
FIG. 9 is a block diagram of an autocorrelation correlation filter which is connected to the output of a camera in one embodiment of the present invention, to produce a filtered image with no streaks.

Referring to FIG. 9, an autocorrelation filter 60 in accordance with the present invention performs real time autocorrelation filtering using hardware which operates at television frame rates. In this embodiment, the camera 42 is a solid-state television camera 42 and the autocorrelation filter 60 includes a video analog-to-digital converter 62 for converting an image signal output by the camera 42 into a digital image signal. The video analog-to-digital converter 62 is connected to a pixel-by-pixel multiplier 64 and two video frame buffers 66 and 68. A switching means includes a microprocessor 70 which controls switches 72 and 74 so as to control the input and output of data to and from the video frame buffers 66 and 68. In the state illustrated in FIG. 9, a digital image signal representing the current video frame (second video frame) is transmitted to the pixel-by-pixel multiplier 64 and the video frame buffer 66. At the same time, the previous video frame (first video frame) is read from the video frame buffer 68, so that the pixel-by-pixel multiplier 64 multiplies the current video frame (second video frame) by the previous video frame (first video frame) and outputs a filtered digital image signal corresponding to an image which does not include the streaks which appear in FIG. 8. That is, the filtered digital image signal will correspond to the image shown in FIG. 3. At the end of the current video frame scan, the connections of the switches 72 and 74 are reversed so that the next current video frame (third video frame) is provided to the video frame buffer 68, while the second video frame is provided to the pixel-by-pixel multiplier 64 for multiplication with the third video frame. Thus, the pixel-by-pixel multiplier 64 is always multiplying the current video frame by the previous (i.e., lagged) video frame. This arrangement provides a new autocorrelation lag image for every TV frame, thereby yielding a real time spark trail filter.

By employing the autocorrelation filter 60 of FIG. 9, the optical apparatus of the present invention is capable of producing a clear image such as that shown in FIG. 3 instead of a distorted image having streaks as illustrated in FIG. 8. Further, the autocorrelation filter 60 of FIG. 9 is suitable for use with all types of apparatus which employ cameras to sense and generate an image, and is not limited to the specific embodiment illustrated in FIG. 4. For example, it may be desirable to retrofit existing seam welders of the type which have the camera positioned adjacent the torch tip. By retrofitting this type of seam welder in this manner, distortions caused by spark trails can be filtered out of the sensed image of the light stripe.

While the optical apparatus of the present invention has been described in conjunction with its use with a seam welder, it may be used on any type of tool which requires optical apparatus for tracking a path of movement of a tool along a line of travel on a workpiece. For example, in addition to being used with a torch during robotic welding, the optical apparatus of the present invention may be used for flame cutting and sealant and adhesive application. In addition, while the autocorrelation filter 60 of the present invention has been described with respect to its use with a seam welder, this filter may be connected to filter any digital image signal, when it is desired to remove transient (i.e., impulse-type) signals from an image to clarify the image. Thus, the autocorrelation filter 60 of the present invention may be used with optical apparatus for any type of tool working in an environment which produces sparks, dust, cuttings or any other type of material which would tend to travel across the field of view of a sensor and distort an image produced by the sensor.

The many features and advantages of the invention are apparent from the detailed specification, and thus it is intended by the appended claims to cover all such features and advantages of the apparatus which fall within the true spirit and scope of the invention. Further, since numerous modifications and changes will readily occur to those skilled in the art, it is not desired to limit the invention to the exact construction and operation shown and described and, accordingly, all suitable modifications and equivalents may be resorted to, falling within the scope of the invention.

What is claimed is:

1. Optical apparatus for tracking a path of movement of a tool along a line of travel on a workpiece, the tool having a first side in front of the tool along the line of travel, a second side behind the tool along the line of travel, and a third side substantially perpendicular to the line of travel, comprising:
    a light source for providing a collimated light beam, said light source being mounted on the tool adjacent the second side of the tool;
    a cylindrical reflector positioned in the path of the collimated light beam and mounted adjacent the third side of the tool, for reflecting at least a portion of the collimated light beam so as to project a light stripe on the workpiece in front of the tool, said cylindrical reflector being positioned with respect to the collimated light beam and the line of travel, so that the projected light stripe is substantially bisected by the line of travel; and
    means for generating an image of the light stripe projected on the workpiece.

2. Optical apparatus as set forth in claim 1, wherein said image generating means comprises:
    a camera mounted on the tool and oriented in a direction such that said camera faces away from the workpiece; and
    means for reflecting an image of a portion of the workpiece including the projected light stripe into said camera.

3. Optical apparatus as set forth in claim 2, wherein said cylindrical reflector comprises a convex cylindrical piece of glass.

4. Optical apparatus as set forth in claim 3, wherein said light source comprises a laser diode.

5. Optical apparatus as set forth in claim 4, wherein the collimated light beam has a diameter in the range of 0.5 to 1.5 mm and wherein said laser diode has a power level in the range of 5 to 20 mW.

6. Optical apparatus as set forth in claim 5, wherein the tool is a seam welder having a torch with a tip and a shield gas cup mounted on said torch adjacent the tip of the torch, and wherein said cylindrical reflector is mounted on the third side of the seam welder adjacent the shield gas cup.

7. Optical apparatus as set forth in claim 2, further comprising means for filtering the image of the light stripe generated by said camera.

8. Optical apparatus as set forth in claim 7, wherein said camera generates an image signal corresponding to the image of the light stripe, and wherein said filtering means comprises:
    an analog-to-digital converter, coupled to said camera, for receiving the image signal from said camera and for generating a digital image signal;
    a multiplier circuit coupled to said analog-to-digital converter;
    first and second buffer circuits, each having an input and an output; and
    switching means, connected to said analog-to-digital converter, said multiplier circuit and the inputs and outputs of said first and second buffer circuits, for selectively connecting the input of one of said first and second buffer circuits to said analog-to-digital converter to receive the digital image signal representing a current video frame, while simultaneously connecting the output of the other of said first and second buffer circuits to said multiplier circuit to provide a stored digital image signal representing a previous video frame to said multiplier circuit, so that said multiplier circuit multiplies the digital image signal representing the current video frame by the stored digital image signal representing the previous video frame, said multiplier circuit providing a filtered digital image signal as an output.

9. Optical apparatus as set forth in claim 8, wherein said camera comprises a solid-state camera.

10. Optical apparatus for tracking a path of movement of a seam welder along a line of travel on a workpiece, the seam welder having a first side in front of the seam welder along the line of travel, a second side behind the seam welder along the line of travel, and a third side substantially perpendicular to the line of travel, comprising:
    a light source for providing a collimated light beam, said light source being mounted on the seam welder adjacent the second side of the seam welder;
    a cylindrical reflector positioned in the path of the collimated light beam and mounted adjacent the second side of the seam welder, for reflecting at least a portion of the collimated light beam so as to project a light stripe on the workpiece in front of the seam welder, said cylindrical reflector being positioned with respect to the collimated light beam and the line of travel, so that the projected light stripe is substantially bisected by the line of travel; and
    means for generating an image of the light stripe projected on the workpiece.

11. Optical apparatus as set forth in claim 10, wherein said image generating means comprises:
    a camera mounted on the seam welder and oriented in a direction such that said camera faces away from the workpiece; and
    means for reflecting an image of a portion of the workpiece including the projected light stripe into said camera.

12. Optical apparatus as set forth in claim 11, wherein said cylindrical reflector comprises a convex cylindrical piece of glass.

13. Optical apparatus as set forth in claim 12, wherein said light source comprises a laser diode.

14. Optical apparatus as set forth in claim 13, wherein the collimated light beam has a diameter in the range of 0.5 to 1.5 mm and wherein said laser diode has a power level in the range of 5 to 20 mW.

15. A seam welder for performing a welding operation along a line of travel on a workpiece, comprising:

a torch having a first side in front of said torch along the line of travel, having a second side behind said torch along the line of travel, and having a third side substantially perpendicular to the line of travel;

a light source for providing a collimated light beam, said light source being mounted on said torch adjacent the second side of said torch;

a cylindrical reflector positioned in the path of the collimated light beam and mounted adjacent the third side of said torch, for reflecting at least a portion of the collimated light beam so as to project a light stripe on the workpiece in front of said torch, said cylindrical reflector being positioned with respect to the collimated light beam and the line of travel, so that the projected light stripe is substantially bisected by the line of travel; and means for generating an image of the light stripe projected on the workpiece.

16. Optical apparatus as set forth in claim . 15, wherein said image generating means comprises:

a camera mounted on said torch and oriented in a direction such that said camera faces away from the workpiece; and means for reflecting an image of a portion of the workpiece including the projected light stripe into said camera.

17. Optical apparatus as set forth in claim 16, wherein said cylindrical reflector comprises a convex cylindrical piece of glass.

18. Optical apparatus as set forth in claim 17, wherein said light source comprises a laser diode.

19. Optical apparatus as set forth in claim 16, further comprising means for filtering the image of the light stripe generated by said camera.

20. Optical apparatus as set forth in claim 19, wherein said camera generates an image signal corresponding to the image of the light stripe and wherein said filtering means comprises:

an analog-to-digital converter, coupled to said camera, for receiving the image signal from said camera and for generating a digital image signal;

a multiplier circuit coupled to said analog-to-digital converter;

first and second buffer circuits, each having an input and an output; and switching means, connected to said analog-to-digital converter, said multiplier circuit and the inputs and outputs of said first and second buffer circuits, for selectively connecting the input of one of said first and second buffer circuits to said analog-to-digital converter to receive the digital image signal representing a current video frame, while simultaneously connecting the output of the other of said first and second buffer circuits to said multiplier circuit to provide a stored digital image signal representing a previous video frame to said multiplier circuit, so that said multiplier circuit multiplies the digital image signal representing the current video frame by the stored digital image signal representing the previous video frame, said multiplier circuit providing a filtered digital image signal as an output.

21. A filter for filtering an image signal produced by a solid-state television camera to remove transient portions of an image corresponding to the image signal, comprising:

an analog-to-digital converter, coupled to the solid-state television camera, for receiving the image signal from said camera and for generating a digital image signal;

a multiplier circuit connected to said analog-to-digital converter;

first and second buffer circuits, each having an input and an output; and switching means, connected to said analog-to-digital converter, said multiplier circuit and the inputs and outputs of said first and second buffer circuits, for selectively connecting the input of one of said first and second buffer circuits to said analog-to-digital converter to receive the digital image signal representing a current video frame, while simultaneously connecting the output of the other of said first and second buffer circuits to said multiplier circuit to provide a stored digital image signal representing a previous video frame to said multiplier circuit, so that said multiplier circuit multiplies the digital image signal representing the current video frame by the stored digital image signal representing the previous video frame, said multiplier circuit providing a filtered digital image signal as an output.

22. Optical apparatus as set forth in claim 21, wherein said switching means comprises:

a microprocessor for generating a switching signal;

a first switch, coupled to said microprocessor, said analog-to-digital converter and the inputs of said first and second buffer circuits, for selectively connecting one of the inputs of said first and second buffer circuits to said analog-to-digital converter in dependence upon the switching signal; and a second switch, coupled to said microprocessor, said multiplier circuit and the outputs of said first and second buffer circuits, for selectively connecting one of the outputs of said first and second buffer circuits to said multiplier circuit in dependence upon the switching signal.

23. A filter as set forth in claim 22, wherein said multiplier circuit comprises a pixel-by-pixel multiplier.

* * * * *